United States Patent [19]

Litton

[11] Patent Number: 5,446,452
[45] Date of Patent: Aug. 29, 1995

[54] TEMPERATURE MONITORING SYSTEM

[76] Inventor: Charles J. Litton, 4903 State Rd., Peninsula, Ohio 44264

[21] Appl. No.: 14,178

[22] Filed: Feb. 5, 1993

[51] Int. Cl.$^6$ ............... G08B 21/00; G08B 17/04
[52] U.S. Cl. ............... 340/870.17; 340/682; 246/159; 128/736
[58] Field of Search ............... 340/870.17, 682, 870.16, 340/445, 447, 825.54, 600, 584; 246/169; 73/292; 128/736

[56] References Cited

U.S. PATENT DOCUMENTS

| | | | |
|---|---|---|---|
| 3,572,355 | 3/1971 | Van de Linden . | |
| 3,812,401 | 5/1974 | Radin | 361/104 |
| 4,316,175 | 2/1982 | Korber et al. | 246/169 |
| 4,361,799 | 11/1982 | Lutz | 324/52 |
| 4,399,441 | 8/1983 | Vaughan et al. | 342/50 |
| 4,476,877 | 10/1984 | Baker | 128/736 |
| 4,501,006 | 2/1985 | Korenberg | 340/862 |
| 4,659,043 | 4/1987 | Gallagher | 246/169 |
| 4,727,359 | 2/1988 | Yuchi et al. | 340/800.17 |
| 4,746,830 | 5/1988 | Holland | 310/313 D |
| 4,777,821 | 10/1988 | Gerve | 73/290 V |
| 4,812,826 | 3/1989 | Kaufman et al. | 340/682 |
| 4,914,422 | 4/1990 | Rosenfield et al. | 340/573 |
| 4,928,910 | 5/1990 | Utterback et al. | 246/169 |
| 5,107,247 | 4/1992 | Malaca | 340/449 |
| 5,203,278 | 4/1993 | Kinney | 246/169 A |
| 5,289,160 | 2/1994 | Fiorletta | 340/447 |

Primary Examiner—James J. Groody
Assistant Examiner—Glenton B. Burgess
Attorney, Agent, or Firm—Oldham, Oldham, & Wilson Co.

[57] ABSTRACT

A temperature measuring system is described which is activated in response to the occurrence of detecting a temperature greater than a predefined critical temperature which includes a transceiver which receives an incoming electromagnetic wave, a temperature sensing means, e.g. a gas thermometer to measure the temperature of the desired component, and an electromagnetically interrogatable transponder chip capable of selectively transitioning from an inactive state to an active state upon the temperature exceeding the predefined critical temperature. The transponder chip when in the active state, converts the electromagnetic wave to a surface acoustic wave which passes over the transponder chip and upon exiting from the transponder chip is reconverted to an electromagnetic wave which is slightly modified from the incoming electromagnetic wave. The difference between the incoming and outgoing electromagnetic wave being a modulated signal which contains information which has been encoded on the transponder for retransmission by the transceiver. The invention also describes a process for detecting a hot component which utilizes the steps of determining the temperature of a component, e.g. a bearing, comparing the component temperature to a predefined critical temperature, upon detecting that the component temperature has exceeded the critical temperature, then closing the transponder chip circuit thereby allowing an incoming electromagnetic wave by the transponder chip to be received and converted to a surface acoustic wave as it passes the path of the transponder chip receiving information encoded in the chip for subsequent conversion to a modulated electromagnetic wave and retransmitting the modulated electromagnetic wave to a decoder for identification of the overheated component.

12 Claims, 4 Drawing Sheets

TEMPERATURE MONITORING SYSTEM

TECHNICAL FIELD

This invention relates to a temperature monitoring system, activated in response to detection of a temperature greater than a predefined critical temperature, in which sensing equipment decodes modulated radio waves reflected by a tag transponder mounted near the equipment to be monitored as used in the transportation industry, particularly the railroad segment. The reflected waves contain equipment identification codes thereby permitting the user to locate the overheated piece of equipment, e.g. a bearing.

BACKGROUND OF THE INVENTION

Modern railroad car wheel bearings are permanently lubricated sealed units designed to last for the life of the car. Sometimes, however, these wheel bearings fail during use, causing excess friction between the axle and the bearing and producing excess heat, resulting in a condition referred to as a "hot box". Normally, the bearings operate at about 20° C. above the ambient temperature. When a bearing begins running at more than about 70°–80° C. above the ambient temperature, it has already failed. If the car continues moving at the same speed, internal fracture of a roller bearing can occur, causing the bearing to seize, and resulting in a thermal run-away. Under these conditions, the bearing temperature rises dramatically from about 20° C. above ambient to more than 300° C. above ambient temperature in about one-half mile of travel. Further travel melts the bearings which fall off the axle with the wheels causing the truck to fall to the ground, uncoupling the car from those in front of it and triggering the emergency brakes on the whole train. This causes the portion of the train behind the disabled car to collapse into an accordion-patterned wreck as railroad cars leave the track.

Brakes that fail to release also produce a dangerous condition that can cause a similar disaster. The affected wheel rises to temperatures on the order of 600° C. and creates a condition known as a "hot wheel". If unchecked, the wheel ultimately disintegrates and a derailment results.

Because the hot box and the hot wheel can be so dangerous, the railroad service industry has devoted significant resources to building detectors that automatically check passing trains for hot boxes and/or hot wheels. Such detectors are conventionally spaced along railroad tracks at about twenty to fifty mile intervals along main-line track throughout the United States, and many are necessarily located in remote places. Although previous efforts have produced several sound products, a number of important problems have not been solved in the prior art.

Detectors in present use, typically include a sensing unit lens for focusing infrared from passing wheels onto an infrared sensor and electrical circuitry to develop a signal that is representative of the journal bearing or wheel temperature. One sensing unit is placed along one rail of the tracks and a second sensing unit is placed along the other rail of a set of tracks, so that both sides of a train can be monitored. Electrical lines connect these track-side sensing units to processing circuitry which is conventionally located in a "bungalow" close to the tracks. The final output signal of the detector can be used to create a written record of the temperature of each of the journals or wheels that passes the sensing units. In hot box detectors, this signal triggers a warning output if the signal indicates that the temperature of a wheel journal exceeds a predetermined value (generally about 70°–80° C. above ambient temperature).

While it is extremely important that no overheated bearings be missed by the hot box detector, it is almost equally important that no false alarms be generated since the unscheduled stopping of a train is a costly and time consuming operation that could result in substantial disruptions of schedules. The infra-red scanner and associated circuits for detecting overheated bearings are highly developed and available commercially from such sources as the Servo Corporation of America of Hicksville, N.Y.

Railroad freight cars in the United States usually have one of two types of bearings, plain bearings or roller bearings. Although plain bearings account for only approximately 16% of the effective rolling stock in the United States, the problems associated with the accurate analysis of signals from plain bearings are of particular importance to the railroad industry since in 1980, plain bearings accounted for 74% of the derailments. Because of different operating characteristics of the different types of bearings, the waveform of the infra-red scanner signal must be analyzed to permit proper bearing identification and proper alarm criteria must be set depending on the type of bearing imaged.

For purposes of the present discussion, the principal difference between roller and plain bearings which leads to problems in scanner signal analysis is that the portion of the plain bearing exposed to the infra-red scanner imaging spot is contained within a housing whereas the roller bearing is viewed directly by the scanner. The plain bearing housing, which protrudes from the car truck frame and is affixed to the frame, serves to siphon off some of the temperature rise of an operating bearing and dissipate it through the truck frame. Since a pair of bearing housings are usually provided on each truck frame located toward the ends of the frame, the surfaces of the housing facing each other (i.e., the housing inner sidewall surfaces) dissipate more heat than the surfaces of the housing facing away from each other (i.e., the housing outer sidewall surfaces). Since it is these inner and outer housing sidewall surfaces which are images by the hot box detector scanner, resultant signals from the scanner depend on which surface of the housing is imaged.

In addition to the above, since the housing protrudes from the truck frame, the leading surface of the housing is exposed to the cooling effect of the air stream generated by virtue of the train movement while the lagging surface is minimally effected by the air stream. The leading and lagging surfaces may be the inner or outer housing sidewall surface depending on the direction of the movement of the train. Roller bearings are not subjected to these problems since roller bearings are directly imaged and they are in rotation during imaging. As a result of the above, the accurate early detection of overheated plain bearings has been extremely difficult.

The prior art also includes the commonly used bolometer type of hot box and hot wheel detector. It employs temperature sensitive resistors (thermistors) in a bridge arrangement. Such units also require a highly stable and accurate high voltage supply. Because the signal-to-noise ratio of the bolometer decreases to unacceptable levels even within the normal operating temperature ranges of the detectors, automatic heaters must be installed to keep the thermistors warm enough to work properly. Once heaters are installed, it may become necessary to upgrade the optical system of the bolometer. Thus overcoming the fundamental problems inherent in a bolometer greatly complicates the device, making it more expensive to build and maintain, and less reliable. In addition, the frequency response of the bolometer is narrower than desired, restricting the top speed a train may be traveling while the bolometer checks for hot boxes or wheels.

Pyroelectric cells are also used as the infrared detection element in hot box and hot wheel detectors. Pyroelectric crystals acquire opposite electrical charges on opposite faces when subjected to a change in temperature. Pyroelectrical cells also exhibit some piezoelectrical properties, but the incidence of spurious signals generated by vibration have been virtually eliminated through physically isolating the cell from vibration. Pyroelectrical cells overcome many of the difficulties associated with bolometers. For example, hot box detectors built around pyroelectric detection schemes cost only about one-fifth to one-half as much as bolometers. Because the pyroelectric cell generates its own electric charge, large power supplies are not needed and the high impedance obviates the careful impedance matching of the bolometer. Further, no heaters are required because the signal-to-noise ratio is substantially flat over the required temperature range. Accordingly, simpler and cheaper optical systems can be used. Nevertheless, use of pyroelectric cells confronts the designer with other serious difficulties.

For example, pyroelectric cells tend to have an extremely poor voltage gain response when considered over any reasonable range of signal input frequencies, that is, over a range of train speeds. The voltage gain response tends to depend on the length of the time that the pyroelectric cell is exposed to the infrared, as well as the strength of the infrared. Thus, a typical infrared sensor employing a pyroelectric cell has an acceptably flat or constant voltage gain response over only about two percent of the frequency range required for acceptable hot detector operation, which is about 0.5 Hz to about 300 Hz. This prevents accurate temperature readings when a linear amplifier is used, yet only the voltage gain has a sufficiently high signal-to-noise ratio to provide a usable signal.

One prior art approach to overcoming this difficulty is to add a compensating signal to the pyroelectric cell signal to produce a signal having a flat frequency response over the normal range of frequencies, as set forth in U.S. Pat. No. 4,068,811. Over time, however, the breakpoint at which the voltage response of the pyroelectric cell begins to decline sharply drifts unpredictably due to changes in capacitance and response time. It may drift up or down the frequency scale; it may drift by different amounts. Neither the magnitude nor the direction of the drift will be the same for different detectors. The circuitry that develops the compensating signal cannot compensate for this drift, and so the detector will not produce the flat voltage response over the relevant frequency range that the remaining circuitry must have for proper operation. This long term signal drift requires frequent calibration checks of the pyroelectric cell. Such checks, and if necessary, re-calibration, are extremely difficult to perform accurately in the field and often require taking the unit to the shop. Even with frequent servicing, such units are often out of calibration and the resulting calibration errors lead to further reporting errors and increased service costs.

Another difficulty is created by the physical characteristics of pyroelectric crystals, namely that they produce an electrical potential only in response to changes in temperature. This characteristic requires that the infrared detector, that is, the pyroelectric cell, be subjected to changes in the amount of infrared striking it. In addition, the normal operating temperature of a railroad wheel bearing is determined relative to the ambient temperature. The requirement of measuring both the wheel bearing temperature and the ambient temperature provides a ready made opportunity to expose the pyroelectric cell to the required changes in infrared. Difficulties arise, however, in choosing a suitable infrared source to determine the ambient temperature.

Some pyroelectric hot box detectors in the prior art approach this problem by merely leaving the detector turned on whenever a train is passing and aiming the lens so that it receives infrared from passing bearings, and from the undercarriage of the railroad cars. This passive-read system assumes that the temperature reading developed from looking at the undercarriage is the ambient temperature, but if, for example, the undercarriage is on fire (which not infrequently occurs from faulty brakes), such a detector will see the heat from the fire as the ambient temperature and will be unable to detect any problem with a bearing, or even to detect the fire itself. Less dramatically, the sensor may measure the heat from a spurious source, such as brakes, and unable to distinguish between hot brakes and hot bearings, issue a hot box warning. Then the crew must stop the train, and walk the train searching for a non-existent over-heated bearing.

Another problem for passive-read systems is presented by the increased use of railroad spine cars, which are a skeleton steel-rail flatbed with trucks attached. Spine cars are used to haul semi-trailers piggyback. When a passive-read hot box detector looks at the undercarriage of spine cars, it is likely to take a "sky shot", and read only infrared from the distant sky as ambient. A sky shot temperature reading is usually about 20° C. to 30° C. less than actual ambient temperature. Naturally, this leads to many false warnings, since a bearing at normal operating temperature would show up as 40° C. to 50° C. hotter than the ambient temperature. Again, the crew must stop the train and walk the train searching for a non-existent hot box.

One prior art approach to overcoming this difficulty is to include a shutter that covers the lens at all times except when the apparatus expects to see a wheel bearing. This practice screens out all spurious infrared from overheated brakes and the like, and takes for its ambient temperature reading, the temperature of the shutter blade inside the detector housing. The detector, however, warms up and cools down more slowly than the true ambient temperature, especially during periods of rapid ambient temperature changes. These changes predictably occur around sunrise and sunset, and unpredictably occur during weather changes and in magnitudes that depend on the season and the weather. The temperature inside the detector housing tends to lag the actual ambient temperature by about two hours. This temperature lag can cause the measured difference between the correct ambient temperature and the journal bearing temperature to be wrong by as much as 10° C. In addition, sun loading can heat the detector unit to a temperature that is considerably hotter than the ambient temperature. These differences between internal detector temperature and the actual ambient temperature can obviously lead to erroneous comparisons between ambient temperature and bearing temperature, creating both false negatives and false positives.

In addition, the prior art shutter detection scheme requires synchronization between the opening and closing of the shutter and the passing of the bearings, which necessitates rapidly starting and stopping the shutter. The shutter is operated by an electric solenoid. The ancillary devices required to synchronize the movement of the shutter with the passing train wheels are complex and expensive. Repeatedly energizing the shutter solenoid wears out the solenoid quickly, and the jolt caused by stopping the shutter sometimes creates spurious signals from the pyroelectric cell due to its piezoelectric characteristics. Accordingly, although use of a synchronized shutter to screen unwanted infrared from the pyroelectric cell avoids the temperature sensing problems of the passive-read system, it leads to complex problems of its own.

Therefore, a need exists for hot box and hot wheel detectors that are less expensive to manufacture, maintain, and operate; that are more reliable; that reduce or eliminate false negative and false positive warnings, both or which are inordinately expensive; and that produce consistent operating results over time by eliminating the effect of pyroelectric cell drift. In particular, a need exists for a direct temperature measuring device of the hot box itself, without the need for comparisons to ambient temperature measurements, which can upon being electromagnetically interrogated, detail the location of the failure, along with additional information pertinent to the failed or failing equipment.

SUMMARY OF THE INVENTION

In accordance with the present invention, there is provided a temperature activated reflected energy system in which sensing equipment decodes modulated radio waves reflected from transponder tags positioned on equipment which passes in a direction normal to the axis of the transmitted waves. The received modulated waves contain specific information allowing a user to identify the overheated part, particularly an overheated bearing or wheel.

It is an object of this invention to provide a reliable temperature sensing system which can provide advance warning to a train operator of an overheated bearing condition.

It is another object of this invention to provide a temperature sensing system which is in an open circuit position when in its normal state and in a closed circuit position in its active state.

It is still another object of this invention to utilize a reflected energy system in which sensing equipment decodes modulated radio waves reflected by a tag (transponder) attached to the equipment containing the component which is being monitored.

It is still another object of this invention to combine a gas sensor which causes a piston to activate the system upon detecting an overheating temperature condition.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Referring now to the drawings wherein the showings are for purposes of illustrating the preferred embodiment of the invention only and not for purposes of limiting the same, the Figures generally show schematics of a gas temperature sensor in combination with an electrical circuit, which upon the gas sensor reaching a predetermined critical set point, will activate a piston, which closes the electrical circuit, thereby permitting remote reading of encoded information resident in nonvolatile memory in the tag by means of electromagnetic interrogation, thereby permitting the detection of the condition generally referred to in the industry as "hot box".

Figure 1:
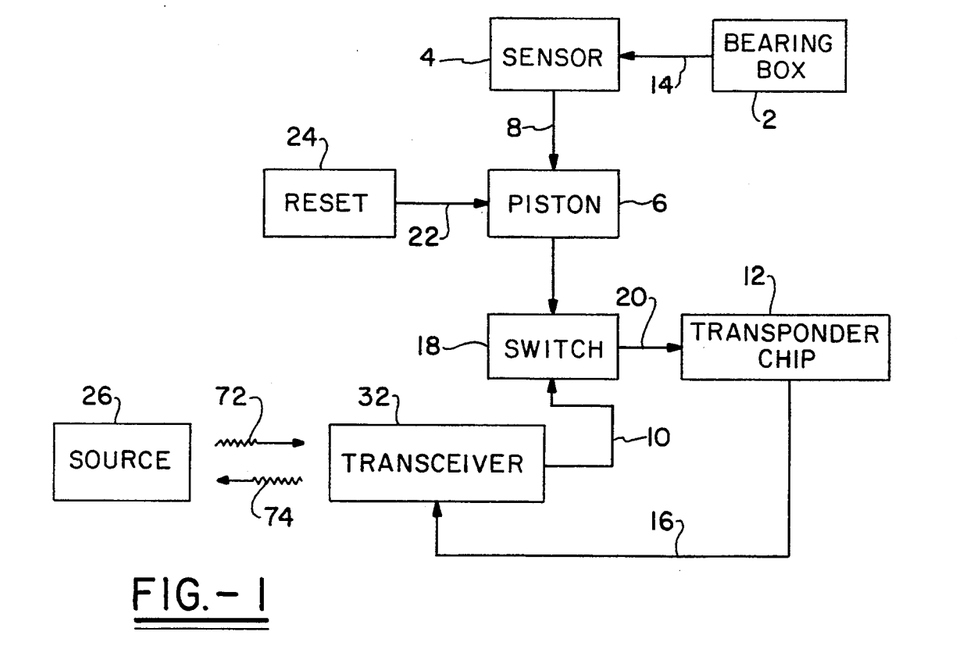
FIG. 1 is a schematic of the of the system which transitions between its inactive state, circuit open, and active state, circuit closed, after having detected that the temperature has exceeded a critical value, thereby activating a piston which closes the circuit through a switch.

In FIG. 1, the temperature of bearing box 2, is measured by temperature sensor 4, through sensor means 14. While there are many different devices which can measure temperature, e.g., thermocouple, or bimetallic plate, etc., in a preferred embodiment, the temperature sensor is a gas thermometer. In such a device, the volume of a gas at constant pressure increases proportionately to the absolute temperature. Or since the volume in the system is constant, as the temperature increases in the system, the pressure generated by the expanding gas correspondingly increases. The behavior of such a gas can be predicted by Boyle's Law, Charles' Law or Guy-Lussac's law. In general terms, the relationship between temperature, pressure, and volume can be represented by the ideal gas formula $PV = nRT$, where P, V, and T represent pressure, volume and absolute temperature respectively, R is the Boltzmann's molecular gas constant and n represents the number of molecules of gas in the system.

The sensor gas volume in line 8 is kept to a minimum by keeping the diameter of the line small, typically in the range of 0.060″ O.D. tubing, and the distance between bearing box 2 and piston 6 as short as practical, preferably less than thirty (30) feet. The sensing gas is typically a lower alkyl ether, such as dimethyl ether or diethyl ether, but can also be ammonia. The only limitations on the choice of the gas is that it be non-toxic, in the event of a rupture in the gas line, and that it not liquify under the generated operating pressures of the system.

In operation, switch 18 is initially open. In this configuration, upon receiving an incoming electromagnetic query 72 generated by source oscillator 26, by receiving antenna or transceiver 32, transponder chip 12 will not send a modulated signal to the transmitting antenna or transceiver 32 to be detected by the original source 26 as circuit 16 is not completed. However, upon bearing box 2 reaching a predefined critical temperature, the pressure generated by the expanding volume in gas sensor 4 will be sufficient to push piston 6 in such a manner as to complete circuit 16 by closing switch 18. In this configuration, upon transceiver 32 receiving electromagnetic interrogation from a source oscillator 26, transponder chip 12 will respond with a reply code and issue a bearing hot signal which is resent via transceiver 32. The transponder will continue to send a bearing hot signal upon interrogation until piston 6 is manually reset via reset switch 24.

Figure 2:
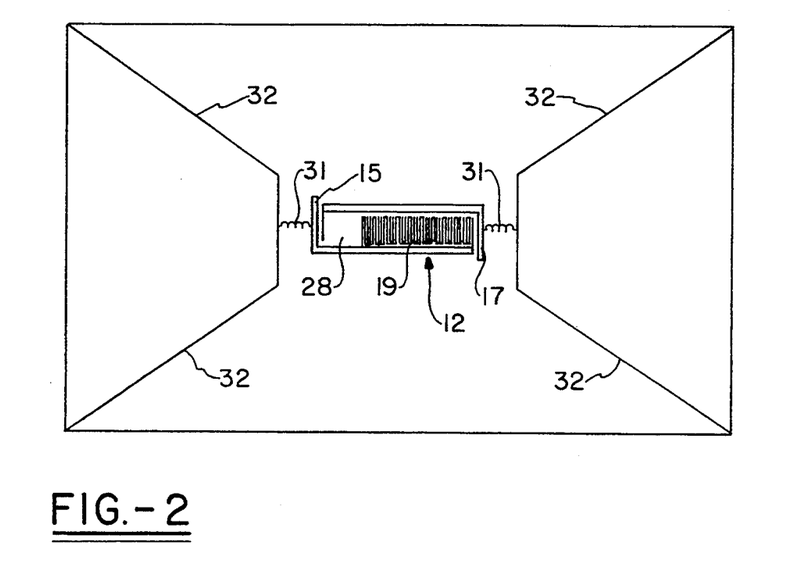
FIG. 2 is a top plan view of the transponder chip embedded in a tag with transceivers.
Figure 2A:
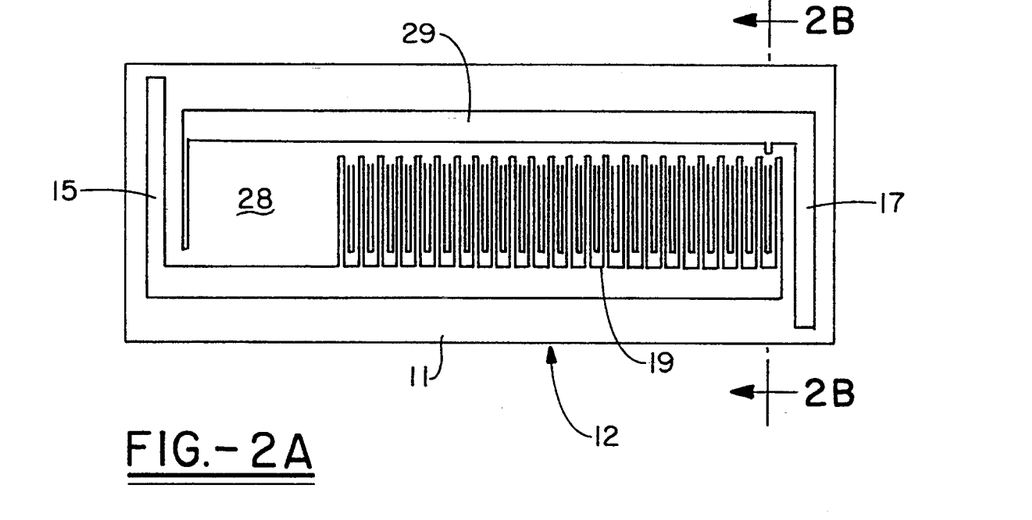
FIG. 2A is a partially exploded top plan view of the transponder chip.

As shown in greater detail in FIG. 2, transponder chip 12 is embedded into tag 30 which contains transceiver 32 via electrical connector 31. The transponder chip 12, shown in greater detail in FIG. 2A, is a lithium niobate (LiNbO$_3$) 28 based chip with an imprinted IDT ??? layer 29 overlayment, similar to that described in U.S. Pat. No. 4,399,441 to Vaughan, published Aug. 16, 1983, which is hereinby incorporated by reference. The chip, upon receiving an electromagnetic signal from a transmitting, converts the signal to a surface acoustic wave (SAW), which passes over the path on the tag, and is subsequently reconverted to an electromagnetic signal for retransmission to a receiver. The chip includes a plurality of transducers 19 at coded locations along the path arranged for retransmitting to the receiver a coded sequence of electromagnetic signals indicative of an article to which the tag is affixed.

Figure 2B:
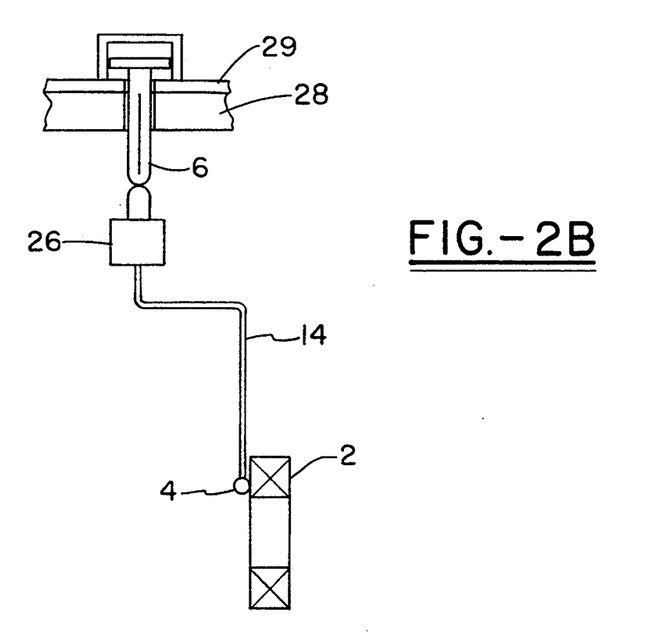
FIG. 2B is a partially exploded cross-sectional view along line B—B of FIG. 2.

As illustrated in FIG. 2B, the sensor for gas thermometer 4 is mounted on the bearing housing 2. Connector 14, which contains the expandable gas, connects to piston actuator 26. Upon the pressure generated by the gas within the gas thermometer 4 reaching a predefined pressure, as related to a predefined critical temperature through the ideal gas equation, piston actuator 26 activates piston 6 permitting either axial or translational movement of the piston to occur thereby completing the circuit. While only one piston and piston actuator are shown in the Figure, there could be multiple sets of pistons and actuators per chip. This may be desirable in some critical operations where redundancy is desired.

As an alternative to the radio transmission type system described above, in a number of instances it may be desirable to have a fully mechanical system that simply gives some visual or audible indication of hot bearings and/or brake problems. In this regard, reference should be made to FIG. 5 which is a schematic showing of a simple mechanical system for achieving this indication. Specifically, the numeral 100 indicates a box which mounts the physical actuator 102 and wherein an actuation force indicated by 104 is moved from a solid line position to a dotted line position 106. The actuator incorporates a spring 108 to prevent damage to the actuator arm as the travel exceeds the specifications. The actuation force typically will be either the same type of thermal actuated plunger shown in FIG. 2B to represent heating of the bearings and/or the brakes, or some actual connection to the brake shoe arms indicating a movement of the brake shoe arms past a predetermined amount showing too much wear on the brake shoes themselves. The arm 102 acts through the connector 110 within the box to move plunger 112 from the solid position to the dotted line position 112A which will close the electrical contact at 114 thus actuating a blinking light 116 or some suitable audible alarm with the electrical connection being from the basic positive/negative electrical line generally indicated by 118. The electrical connector associated with the actuator 112 is identified by numeral 113 and preferably is magnetic so that there is a magnetic attraction and a good lock on connection 114 to close the circuit when actuation takes place so as to assure that the blinking light and/or audible alarm is shown continuously. The release of the system once actuation takes place can be by a manual release plunger 120.

Figure 5:
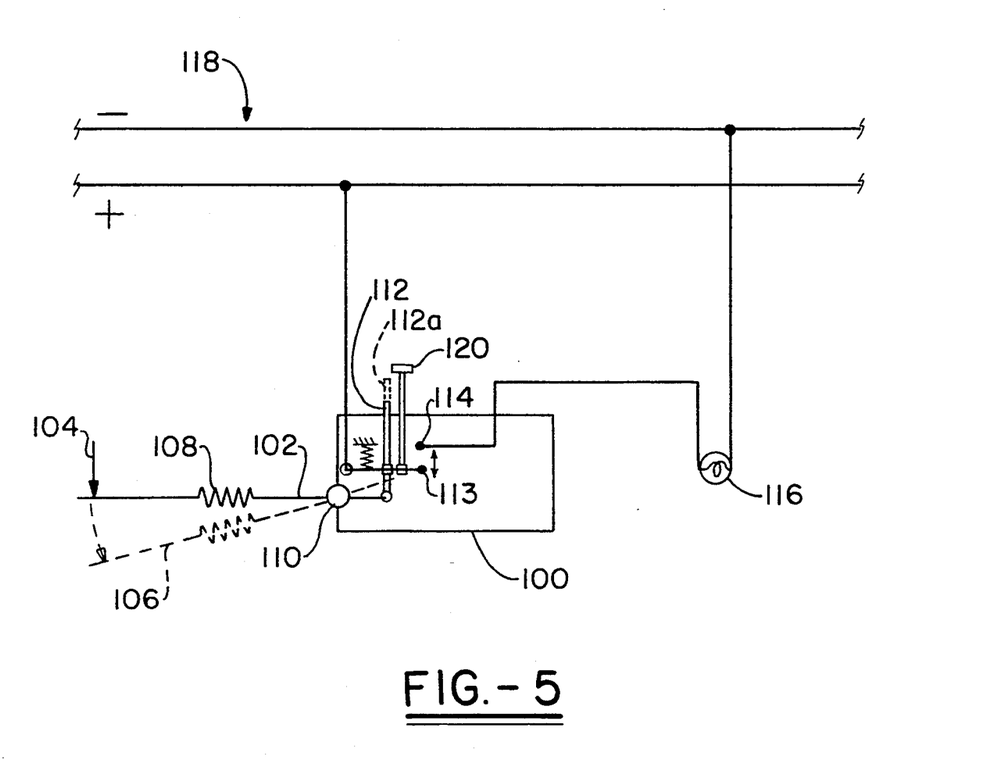
FIG. 5 is a schematic diagram of a modified switching arrangement that can work with the wheel bearings or the brake shoes, and which is a completely mechanical system that actuates a blinking light, rather than working with the RF module.

The actual positioning of the unit to detect overheating is as described above, and whatever unit is utilized will effect the actuation force 104.

This system is very simple, yet highly effective, because it will continuously indicate by the blinking light or the audible alarm that a bearing is bad, and a separate blinking light will be associated with each specific bearing or brake. Even if the blinking light is not noticed until the train has come to a stop and the bearing has cooled, it will show there is a problem with that particular bearing or brake. Thus a quick visual inspection of the cars at any time that the train is stopped or people could walk by, will immediately tell whether or not there is a hot bearing or a bad brake. This system is considerably less expensive and simpler than the RF system also described herein, but utilizes the same basic structural setup and actuation associated with the wheel bearings and brakes.

For automatic identification purposes, each unit of equipment is fitted with a small tag containing the transponder chip with alphanumeric code of the equipment and related information. This code shall be read by an interrogator (reader) which operates on ultra high frequency radio waves. The interrogation unit shall decode the altered radio waves reflected by the tag on the equipment. The altered radio waves (modulation) shall indicate the alphanumeric identification code of the equipment as well as other predefined information.

The interrogator shall optionally add its own identification number, the date and time, and shall transmit all of this data over the user's communications link used for sending such messages. The system will accurately read freight trains moving up to eighty (80) mph, with any equipment configuration, e.g. double stack containers, containers on chassis on flatcars; end-of-train devices. This requirement applies in areas of one, two, and more than two parallel tracks, at ordinary track centers, with trains standing or operating on any or all of these tracks, in the same or opposite direction.

The tag unit is tamperproof and sealed such that it will survive and operate properly under the conditions of its expected operating environment. Tag life shall not be less than fifteen (15) years, and no maintenance shall be required. The tag meets test standards for long-term physical, radio frequency, thermal, and ultra-violet exposure. The tags operate within the temperature range of −50° C. to +85° C., and will maintain the integrity of the stored data at temperatures of −60° C. to +85° C. The tags are not damaged by the normal operation of shipborne radar or other electromagnetic sources normally found in or near railroad facilities. They are capable of full operation in the electromagnetic environment normally found at railroad facilities. The tags are capable of being programmed in the railroad environment by user personnel.

The minimum antenna effective isotropic radiated power (EIRP) and interrogator receiver sensitivity are adequate to properly interrogate tags capable of responding as specified. The maximum EIRP and transmitter power output of the interrogator shall be within the limits prescribed by the telecommunications authority of the country in which the interrogator is operated.

Interrogator units are capable of interrogating multiple tags within their reading field, and discriminating between the tags without misreading. Interrogators employing tag response levels as a method of discriminating between multiple tags may accomplish this by distance differential and/or position relative to the antenna pattern. Error detection is used to ensure reading accuracy.

The system detects for the presence and direction of movement of each individual unit of rolling stock and shall provide suitable output words for missing and incorrect tags, and incorrect characters if appropriate. The equipment detector function provides for sensing the following conditions: (1) equipment presence, detecting each unit of rail rolling stock, whether equipped with a tag or not, including cars, locomotives and cabooses; and (2) train presence, transitioning the system from idle to active mode upon the approach of a train or a cut of cars or a single car. Upon the train or car(s) leaving the system, the system shall provide a "clean list" report on the net movement of equipment and the system shall transition to the idle mode. This "clean list" will contain no duplications or omissions of rolling stock initials and numbers due to stops and reverse moves before the interrogator.

Figure 3:
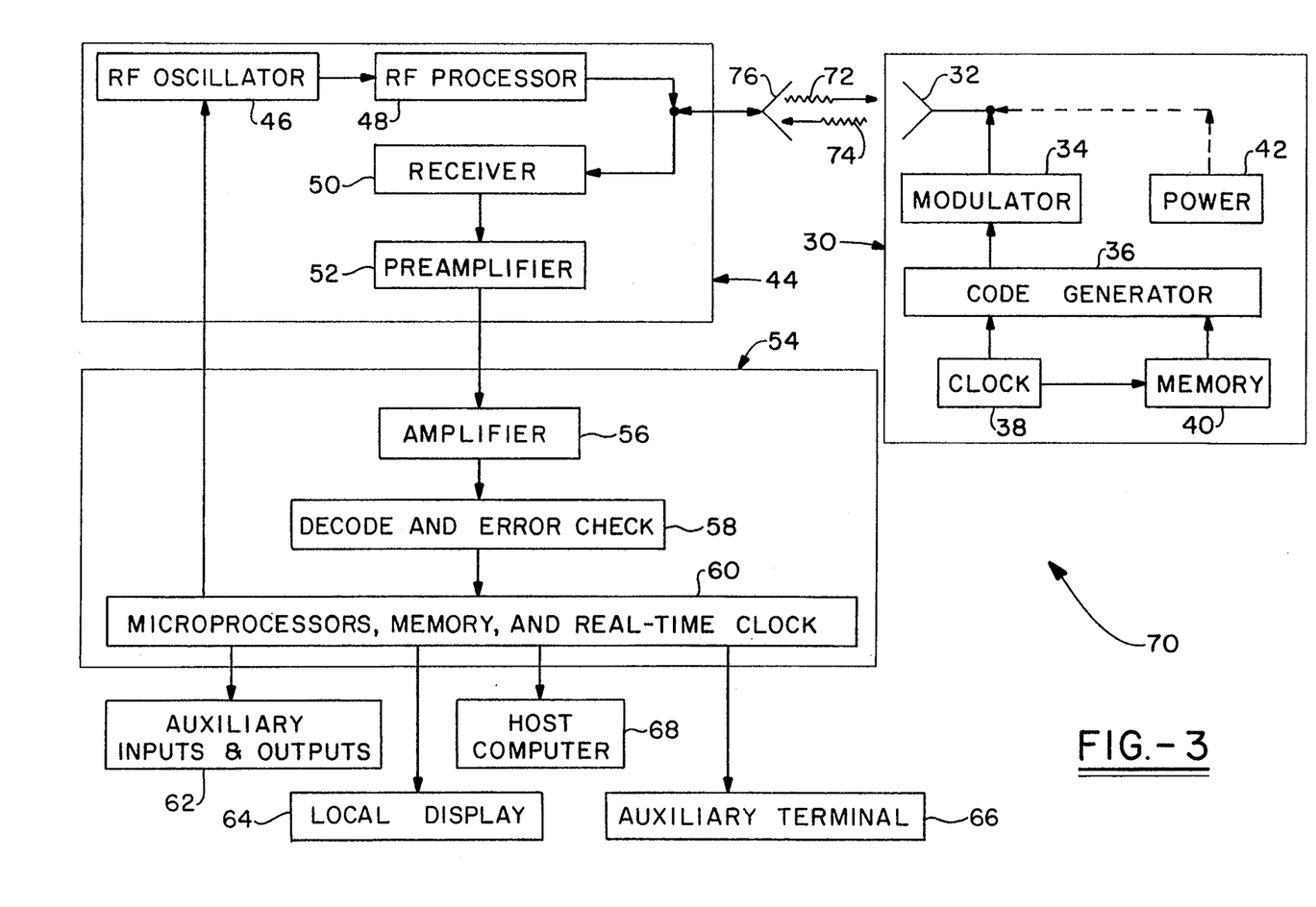
FIG. 3 is a schematic of the system component parts including a tag (transponder), RF module, and reader with associated peripherals.

The radio communication system 70 described consists of a reader system 54, RF module 44, and tags 30. The tags are placed on objects to be identified, and readers, antennas, and RF modules are installed at points to record the passing of tagged objects. The system is designed for localized application where the tag passes by the reader system.

The block diagram of FIG. 3 indicates the function of each component. RF module 44 transmits an unmodulated signal 72 in the direction of a tag 30 through transmitting/receiving antenna 76. The tag reflects a modulated signal 74 back to the RF module 30 through its transmitting/receiving antenna 32. The RF module receives the reflected signal 74 through antenna 76 from the tag 30 and relays this information to the reader 54. The reader decodes the information contained in the tag and relays the information to a host computer for subsequent use to identify, track and schedule the tagged objects.

Tag 30 is not a transmitter and does not contain components to generate RF signals. The tags are field disturbance devices, slightly modifying and reflecting the signal transmitted by the reader system. This slight modification of the signal includes the unique identification code of the tag. This method of communication is called "modulated backscatter".

RF module 44 is composed of an RF oscillator 46, RF processor 48, receiver 50 and preamplifier 52. The RF module is responsible for transmitting and receiving radio energy. RF energy is generated by the RF oscillator 46 and amplified by the RF processor 48. This unmodulated energy 72 is transmitted through antenna 76, and the RF energy reflected 74 by tag 30 is also received by the same antenna 76. The RF module transmits a single frequency of RF energy and receives that same frequency after it is reflected from the tag.

The receiver 50 is used to separate the transmitted continuous wave (CW) energy from the information reflected by the tag 30. The tag information is encoded into 20 and 40 kHz signals which modulate the RF energy reflected by the tag. In one embodiment of the invention, the RF module has the following approximate specifications:

EXAMPLE

| | |
|---|---|
| nominal RF power (measured at transmitter) | 2.0 Watts |
| standard transmit and receive frequency | 912 MHz |
| other reader frequencies available | 904–912 MHz & 918–928 MHz |
| frequency stability | 0.0005% |
| harmonic output | −50 dBc |
| spurious output | −60 dBc |
| transmitter bandwidth | 5 kHz |
| receiver bandwidth | 130 kHz |
| frequency separation for multiple reader systems | 2 MHz |

RF module 40 receives the modulated signal 74 from the tag 30 and passes the 20 and 40 kHz modulating frequencies to the reader 54. The reader decodes the frequencies into binary information equivalent to the 128 bits of data stored in the tag. The reader is composed of the amplifier 56, decoding and error checking circuit 58, microprocessor(s), memory, real-time clock circuit, and power supply 60. The reader system is capable of using a single antenna to transmit and receive RF energy.

Tag 30 contains the modulator 34, optional power source 42, code generator 36, clock 38, memory 40, and antenna 32 circuits. The clock 38 circuit sequences all circuit functions such that information stored in the memory 40 circuit is conveyed to the reader system within precise timing. The information stored in the memory 40 circuit is permanent, and is a unique code which is specified by the owner prior to installation of the tag 30 onto its respective object (container, rail car, truck etc.).

The code generator 36 encodes the information stored in the memory 40 circuit. Modulator 34 collects the encoded information from the code generator 36 and controls the antenna 32 circuit such that the encoded information is reflected to the reader system. There are two versions of the tag 30; (1) battery-powered; and (2) non-battery-powered. The non-battery tag must be sufficiently close to the reader system's antenna 76 in order to collect enough energy to activate the tag's electronics. The battery-powered tag does not require as close proximity to the reader system's antenna 76 since the battery 42 activates the electronics at all times. Advantages of the battery tag include greater range and reduced RF power required from the reader system. The advantage of the non-battery tag is an extended life. Regardless of whether the tag has a battery or not, the tag does not transmit RF energy; it only reflects energy transmitted by the reader system.

Figure 4:
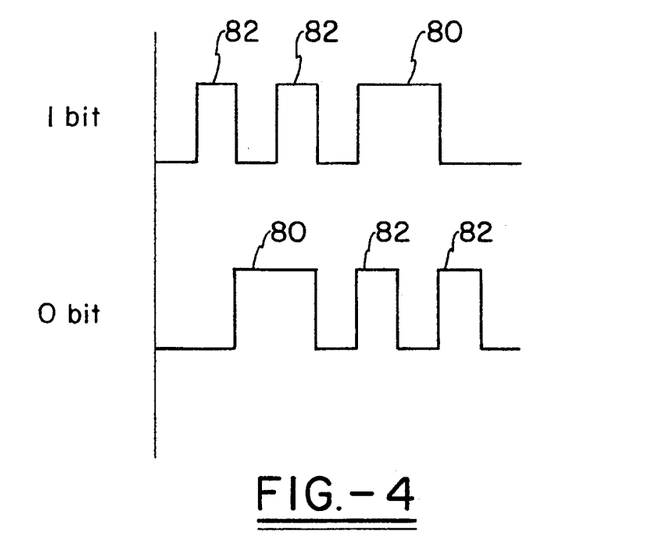
FIG. 4 is a representation of the waveforms associated with a "1" bit and a "0" bit.

The encoding of user data bits include 8 sub-bits for each user bit. A sub-bit is coded by the tag and decoded by the sensing equipment with a modified frequency shift keying (FSK) code using two harmonically related frequencies, one (40 kHz) being the exact double of the other (20 kHz), with a frequency tolerance of ±10%. As shown in FIG. 4, a "0" bit consists of one 20 kHz square wave cycle 80 followed by two 40 kHz square wave cycles 82. A "1" bit consists of two 40 kHz square wave cycles 82 followed by a 20 kHz square wave cycle 80. All transitions are phase-continuous. Tag 30 produces a waveform which has a nominal 1 microsecond rise and fall time and duty cycle for the 20 and 40 kHz square waves cycles of 50%.

The tag electronics cause the data to scroll repeatedly without pause from bit "cell" 127 of a frame (a frame consisting of all 128 bits) to bit "cell" 0 of the succeeding frame. The tag uses the coded identification data and related permanent information to amplitude-modulate the incoming continuous wave radio frequency carrier signal 72 from the sensing equipment. The resulting modified FSK signal (carrier and sidebands) 74 are reflected by the tag 30, transmitted through antenna 32, received by the sensing equipment antenna 76 for decoding, and after decoding, made available to automatic data processing systems. The modulation polarity is of no consequence.

The non-battery tag does not operate in root mean square (RMS) electric field strengths below 2.0 V/m, and preferably operates in RMS electric field strengths above 3.5 V/m. The field strength required for non-battery tag operation does not increase by more then 3 dB when it is rotated by ±25° in any plane. The battery tag has a minimum sensitivity such than an interrogating signal of 150 millivolts/m will allow proper tag operation. Tags are typically operational within four milliseconds of excitation by an interrogating signal from the sensing equipment. The tags survive and maintain the integrity of stored data in a maximum peak field strength of 50 V/m for 60 seconds, as may be encountered from any radio frequency source such as voice communications equipment.

When a properly presented tag is excited as indicated by an incident wave at a given reference range, it shall respond within the following modulated return signal strength, exclusive of carrier and as measured at the same reference range as shown in Table I.

TABLE I

| Tag Type | Frequency (MHz) | Reference Range | Test Conditions | Minimum RMS Signal ($\mu$v/m) | Maximum RMS Signal ($\mu$v/m) |
| --- | --- | --- | --- | --- | --- |
| Beam (non-battery) | 904–928 | 5 m | 3.5 V/m at tag | 19,600 | 56,800 |
| Battery | 904–928 | 10 m | EIRP = 1 W | 1,400 | 4,100 |

The battery tag's return signal strength is reduced by no more than 3 dB when the tag is rotated by ±10° in the plane coincident to the antenna polarization (horizontal for railcars, locomotives, chassis, and end-of-train devices; vertical for trailer and container tags), or rotated by ±20° in the plane perpendicular to the antenna polarization.

The tag 30 is composed of 128 bits of non-volatile memory which can be divided into two sections. The first section is composed of data bits which are used for procedural needs and the second section is composed of data bits which are available for general use. Procedural needs include error checking, detecting a 128 bit frame of data, indicating the type of data format utilized in the tag, and providing security from unauthorized duplication of the tags. Twenty-six bits are used for procedural needs and 102 bits are available for general use.

While not wishing to be bound to the exemplary fields displayed below, Table II illustrates but one example of the fields reserved for procedural needs. It is recognized that other configurations are possible and known to those skilled in the art.

TABLE II

| Field Designation | Bit position |
| --- | --- |
| First check sum | 60,61 |
| Security | 106–117 |
| Format code | 118–123 |
| Second check sum | 124,125 |
| Frame marker | 126,127 |

There are three methods of error detection which are derived from the tag data and the way it is conveyed to the reader. The check sum fields are used in one of the methods to detect errors in the data received by the reader. The first check sum is calculated by adding bits 0 through 59 and truncating all but the right-most two bits of the binary resultant. This calculation is done automatically by the tag programmer at the instant the tag is programmed. When the reader acquires tag information, it checks these two bits to help determine if there is an error in the previous 60 bits.

Twelve bits have been reserved for security purposes, although if security is not desired, these bits can be designated for limited general use. The security field is divided into two six-bit fields. For security applications, the two fields may contain any combination of the values presented in a predefined array or one field must contain a security value of the predefined array, while the other field may contain any value permitted by the system. If security is a concern, then a unique security character can be assigned to the owner's tag programmer at the time of the purchase or the security field can be programmed at the factory. If the user does not require security, then the two fields can contain any combination of valid values.

The format code indicates the type of coding scheme utilized for the bits defined for general use. The following binary format codes, most significant bit on the left, have been assigned:

(1) 000000: Indicates 6-bit ASCII format. This format partitions the general user area into contiguous six-bit fields into which any character permitted by the system can be programmed; and
(2) 110011: Data format defined by the International Standards Organization Draft International Standard (DIS 10374 and DIS 10374 Addendum 1 and the Association of American Railroads Standard. These standards guarantee that the data format, tag type, check sums, frame markets, equipment group code and security fields will be fixed for all types of referenced equipment and will be uniformly positioned and defined. Other fields such as the owner's code, and length may expand, contract, or change definition from one type of equipment to the next.

The second check sum function and method of calculation is similar to the first check sum except that it is used to help verify the data integrity of tag bits 62 to 123.

The frame marker bits contain a special unique signature which is neither a one or a zero, and is used to indicate the start of the next frame.

The allocation and definition of tag data bits available for general use are defined for railcars, locomotives, trailers, chassis, end-of-train devices, and internodal containers.

All physical measurements, such as length, height, weight, etc., are in integer numbers. Fractional measurements are rounded to the next higher integer. Unless otherwise specified, data elements are defined as specified in the AAR Universal Machine Language Equipment Register (UMLER) Data Specification Manual. For the owner code and equipment number, trailing blanks shall be employed on the owner alpha code, and leading zeros are used on the numeric identification field.

For tag mounting on the equipment to be tagged, the mounting surface must be metal, vertical and smooth within the area of the tag and extending one inch from any side of the tag. In case of the desired mounting area not meeting this requirement, a mounting bracket must be provided to satisfy this requirement.

If the mounting surface is irregular or non-metal, (e.g. fiberglass), the tag must be attached to a metal backplate to provide an electrical reflector for the tag. A $\frac{1}{8}$" or thicker smooth metal backplate extending at least one inch from each side of the tag should be used.

Tags are mounted to maximize readability. The "clear zone", surrounding the tags and toward the wayward side must not be obstructed by any metallic object(s) or protrusion(s). Any obstructions in the "clear zone" may introduce problems with the tag. When possible, tags should be mounted in locations to minimize the likelihood of damage from equipment such as forklifts, piggypackers, and other hazards.

Each railcar and locomotive shall carry two tags. One tag shall be located in a window on the BL (B End-Left) portion of railcars and FR (F End-Right) portion of locomotives. The other tag shall be located in a window on the AR (A End-Right) portion of railcars and RL (R End-Left) portion of locomotives.

For articulated cars, each car shall carry at least two tags. Optionally, two tags may be placed on each platform. In that case, for the purpose of tag installation, the B end of each platform (other than the B platform) shall be considered as that end of the platform that is closer to the B platform.

The tags should be positioned as follows: from the centerline of the truck, to two feet toward the center of the vehicle measured from the centerline of the inside axle. The tags preferably are two to five feet above the top of the rail. They are mounted on a plane perpendicular to the ground and shall be oriented with horizontal polarization (with the long axis parallel to the rail). The tag shall not protrude beyond the clearance profile of the vehicle to which it is attached. For tank cars, it is recommended that the tags not be attached to the tank itself, except as may be permitted.

For railroader-type vehicles, vehicles with integral rail wheels, they should be treated and tagged as both cars and trailers. Vehicles without rail wheels, should be tagged as trailers or chassis, and the rail trucks for those vehicles should be tagged as rail cars. It is recommended that for the rail trucks, BL and AR tags be placed on the sign boards, if available.

Each end-of-train device shall be affixed with one tag, on a side of the device to be determined by the owner. At the owner's option, two tags may be used, with one tag on each side of the device. The tags shall be mounted such that they will respond to a horizontally polarized interrogating signal (long axis parallel to the rail).

What is claimed is:

1. A temperature monitoring system activated in response to the occurrence of detecting a temperature greater than a predefined critical temperature which comprises:
   (a) a transceiver which receives an incoming electromagnetic wave and subsequently retransmits a modified electromagnetic wave;
   (b) a temperature sensing means which upon detecting the temperature which is greater than the predefined critical temperature will complete an electronic circuit which is initially in an open inactive state; and
   (c) an electromagnetically interrogatable transponder chip capable of selectively transitioning from the inactive state to an active state upon the temperature sensing means detecting the predefined critical temperature, the transponder chip when in the active state, converts the electromagnetic wave to a surface acoustic wave which passes over the transponder chip and upon exiting from the transponder chip is reconverted to an electromagnetic wave which is slightly modified from the incoming electromagnetic wave, the modification being a modulated signal which contains information which has been encoded on the transponder for retransmission by the transceiver.

2. The system of claim 1 wherein the temperature sensing means is a gas thermometer.

3. The system of claim 1 wherein the selective transitioning from the inactive to the active state is automatic upon the sensing means detecting the critical temperature.

4. The system of claim 3 wherein the selective transitioning is effected by a piston activated by a pressure generated by the gas in a temperature sensing means.

5. The system of claim 1 wherein the transponder comprises:
   (a) an IDT; and
   (b) a LiNbO$_3$.

6. A temperature monitoring system activated in response to the occurrence of detecting a temperature greater than a predefined critical temperature which comprises:
   (a) an interrogatable tag containing specific identification coding of a piece of equipment, the tag being capable of receiving an unmodulated electromagnetic wave and modulating it with encoded information for subsequent retransmission by frequency shift keying as a retransmitted modulated electromagnetic wave;

(b) an RF module which generates oscillating electromagnetic radiation used to query, the tag and receive the retransmitted modulated electromagnetic wave; and (c) a reader to decode the retransmitted modulated electromagnetic wave.

7. The system of claim 6 wherein the interrogatable tag comprises:

(a) a transceiver to receive the unmodulated electromagnetic wave and retransmit the modulated electromagnetic wave;

(b) a code generator to convert equipment-specific information into computer data;

(c) a real-time computer clock to sequence all circuit functions so that encoded information is conveyed to the reader within precise timing;

(d) a non-volatile memory containing the equipment-specific information; and (e) a modulator to collect the computer data from the non-volatile memory and retransmit the data through the transceiver to a reader system.

8. The system of claim 6 wherein the system further comprises a power source.

9. The system of claim 8 wherein the power source is a battery.

10. The system of claim 6 wherein the RF module comprises:

(a) an RF oscillator to generate a continuous unmodulated electromagnetic wave;

(b) an RF processor to amplify the wave;

(c) a transceiver to transmit the wave and receive a modulated electromagnetic wave containing equipment specific information reflected from a tag; and (d) a receiver to separate the continuous unmodulated electromagnetic wave from the modulated electromagnetic wave containing the equipment specific information.

11. The reader of claim 6 which further comprises a decoder which translates the modulated frequencies using a modified frequency shift keying code using two harmonically-related frequencies into a binary information equivalent of the modulated frequency transmitted from the RF module.

12. A process for detecting a hot component which comprises the steps of:

(a) determining a temperature of a component;

(b) comparing the temperature to a critical temperature;

(c) repeat steps (a) and (b) until the temperature is at least equal to a critical temperature;

(d) close a circuit in a transponder chip when the temperature is at least equal to the critical temperature;

(e) receive an incoming electromagnetic wave by the transponder chip which is converted to a surface acoustic wave, which passes over a path of the transponder chip receiving information encoded in the chip;

(f) converting the surface acoustic wave to a modulated electromagnetic wave; and (g) retransmitting the modulated electromagnetic wave to a decoder for identification of the component.

* * * * *